(12) United States Patent
Sakai et al.

(10) Patent No.: US 9,269,941 B2
(45) Date of Patent: Feb. 23, 2016

(54) MOLTEN SALT BATTERY

(75) Inventors: Shoichiro Sakai, Osaka (JP); Atsushi Fukunaga, Osaka (JP); Atsushi Yamaguchi, Osaka (JP); Koji Nitta, Osaka (JP); Masatoshi Majima, Osaka (JP); Shinji Inazawa, Osaka (JP)

(73) Assignee: SUMITOMO ELECTRIC INDUSTRIES, LTD., Osaka-Shi, Osaka (JP)

( * ) Notice: Subject to any disclaimer, the term of this patent is extended or adjusted under 35 U.S.C. 154(b) by 423 days.

(21) Appl. No.: 13/879,962

(22) PCT Filed: Oct. 19, 2011

(86) PCT No.: PCT/JP2011/074061
§ 371 (c)(1),
(2), (4) Date: Apr. 17, 2013

(87) PCT Pub. No.: WO2012/053555
PCT Pub. Date: Apr. 26, 2012

(65) Prior Publication Data
US 2013/0202942 A1    Aug. 8, 2013

(30) Foreign Application Priority Data
Oct. 20, 2010    (JP) .................. 2010-235762

(51) Int. Cl.
*H01M 2/02*    (2006.01)
*H01M 2/26*    (2006.01)
(Continued)

(52) U.S. Cl.
CPC ................ *H01M 2/266* (2013.01); *H01M 2/18* (2013.01); *H01M 2/263* (2013.01);
(Continued)

(58) Field of Classification Search
CPC ................ H01M 2/02; H01M 2/0277; H01M 2300/0045; H01M 2300/0048; H01M 10/399; H01M 2/266; Y02E 60/122
See application file for complete search history.

(56) References Cited

U.S. PATENT DOCUMENTS

| 4,003,753 A | 1/1977 | Hall |
| 4,306,004 A | 12/1981 | Kaun et al. |

(Continued)

FOREIGN PATENT DOCUMENTS

| GB | 12-14413 A | 12/1970 |
| JP | 51-16611 B1 | 5/1976 |

(Continued)

OTHER PUBLICATIONS

International Preliminary Report on Patentability for PCT/JP2011/074061, issued May 8, 2013, 9 pages.

(Continued)

*Primary Examiner* — Stewart Fraser
(74) *Attorney, Agent, or Firm* — Ditthavong & Steiner, P.C.

(57) ABSTRACT

A molten-salt battery is provided with rectangular plate-like negative electrodes (21) and rectangular plate-like positive electrodes (41) each housed in a bag-shaped separator (31). The negative electrodes (21) and positive electrodes (41) are arranged laterally and alternately in a standing manner. A lower end of a rectangular tab (22) for collecting current is joined to an upper end of each negative electrode (21) close to a side wall (1A) of a container body (1). The upper ends of the tabs (22) are joined to the lower surface of a rectangular plate-like tab lead (23). A lower end of a rectangular tab (42) for collecting current is joined to an upper end of each positive electrode (41) close to a side wall (1B) of the container body (1). The upper ends of the tabs (42) are joined to the lower surface of a rectangular plate-like tab lead (43).

3 Claims, 6 Drawing Sheets

(51) Int. Cl.
H01M 2/18 (2006.01)
H01M 10/04 (2006.01)
H01M 10/39 (2006.01)

(52) U.S. Cl.
CPC ..... H01M 10/0459 (2013.01); H01M 10/3909 (2013.01); H01M 10/399 (2013.01); H01M 10/3981 (2013.01); H01M 2300/0048 (2013.01)

(56) References Cited

U.S. PATENT DOCUMENTS

| | | | |
|---|---|---|---|
| 5,098,800 A * | 3/1992 | Plichta et al. | 429/112 |
| 6,015,637 A * | 1/2000 | Mitate et al. | 429/231.1 |
| 2009/0212743 A1 | 8/2009 | Hagiwara et al. | |
| 2012/0088139 A1 | 4/2012 | Sakai et al. | |
| 2012/0219844 A1* | 8/2012 | Tsutsumi et al. | 429/153 |
| 2013/0224568 A1* | 8/2013 | Fukunaga et al. | 429/160 |

FOREIGN PATENT DOCUMENTS

| | | |
|---|---|---|
| JP | 52-111631 A | 9/1977 |
| JP | 57-61270 A | 4/1982 |
| JP | 60-253157 A | 12/1985 |
| JP | 06-223870 A | 8/1994 |
| JP | 07-302616 A | 11/1995 |
| JP | 2004-103422 A | 4/2004 |
| JP | 2004-253289 A | 9/2004 |
| WO | WO 2011007548 A1 * | 1/2011 |
| WO | 2011135967 A1 | 11/2011 |

OTHER PUBLICATIONS

International Search Report for PCT/JP2011/074061 mailed Jan. 10, 2012.

Chinese Office Action for related Chinese Patent Application No. 201180050161.6, dated May 13, 2015, 17 Pages.

* cited by examiner

Fig.6

| Positive electrode thickness (mm) | Number of positive electrodes (pieces) | Capacity density (mAh/g) | | | | | |
|---|---|---|---|---|---|---|---|
| | | 0.1C | | 0.5C | | 1C | |
| | | Charging | Discharging | Charging | Discharging | Charging | Discharging |
| 0.5 | 40 | 75 | 71 | 75 | 68 | 68 | 64 |
| 1 | 20 | 75 | 64 | 60 | 41 | 23 | 19 |
| 2 | 10 | 64 | 56 | 49 | 30 | - | - |
| 5 | 4 | 53 | 30 | - | - | - | - |

MOLTEN SALT BATTERY

TECHNICAL FIELD

The present invention relates to a molten-salt battery that uses a molten salt electrolyte and, more particularly, to a molten-salt battery in which a separator containing a molten salt is arranged between a positive electrode and a negative electrode.

BACKGROUND ART

Power generation by solar power, wind power, and other natural energy resources, which emits no carbon dioxide, has recently been promoted. However, the amount of power generation by natural energy is subject to natural conditions such as climate and weather. In addition, since it is difficult to adjust the amount of power generation to meet demand, electric-load leveling is needed. Thus leveling generated electric energy through charging and discharging requires a high-energy-density, high-efficiency, and high-capacity storage battery. Molten-salt batteries, which use a molten salt electrolyte to meet such requirements, have been attracting attention.

A molten-salt battery includes an electric generation element composed of, for example, a positive electrode in which a current collector contains an active material of sodium compound particulates, a negative electrode in which a current collector is plated with metal such as tin, and a separator impregnated with a molten salt composed of an alkali metal cation, such as sodium or potassium, and an anion containing fluorine. The separator is arranged between the positive electrode and the negative electrode. In such a molten salt, the free-ion density of the cation is several orders of magnitude higher than that in non-aqueous (oil-based) electrolytes used for lithium ion batteries. It is therefore possible to increase the thickness of the positive-electrode and negative-electrode active materials to achieve a higher capacity.

Sodium-sulfur batteries have undergone many trials to increase the size and therefore the capacity of a cell (see Patent Document 1, for example). Also, Patent Document 2 discloses a technique of stacking plate-type sodium-sulfur cells to provide a space-saving stacked-type molten-salt battery.

On the other hand, lithium ion batteries, which have low electrolytic conductivity, are required to have positive and negative electrodes with large areas to collect a greater current. For this reason, rolled forms are common in which positive and negative electrodes are wound with a separator therebetween and, among such forms, a thin electrode form is known to be effective in which an active material is applied to a current collector composed of a thin metal foil. For example, Patent Document 3 discloses a high-power and high-energy-density non-aqueous secondary battery that uses an aluminum foil with a thickness of 1 to 100 μm.

PRIOR ART DOCUMENTS

Patent Document 1: Japanese Laid-Open Patent Publication No. 2004-253289

Patent Document 2: Japanese Laid-Open Patent Publication No. 2004-103422

Patent Document 3: Japanese Laid-Open Patent Publication No. 60-253157

SUMMARY OF THE INVENTION

Problems that the Invention is to Solve

Unlike sodium-sulfur batteries, which use liquid sulfur as a positive-electrode active material, in molten-salt batteries, which use particulate solids as a positive-electrode active material, however, the cation is less likely to diffuse deeply into the positive-electrode active material. Thus, there is a limitation to increasing the thickness of the electrode, to which the technique of size increase disclosed in Patent Document 1 is difficult to apply. The technique disclosed in Patent Document 2 requires a separate battery container for each cell, which naturally limits space saving. Further, the technique disclosed in Patent Document 3 exhibits a lower housing efficiency in the case of housing rolled electrodes in a rectangular parallelepiped battery container, and the problem also lies with the process itself of rolling the positive electrode containing a particulate active material.

Accordingly, it is an objective of the present invention to provide a high-capacity and high-energy-density molten-salt battery.

Means for Solving the Problems

To achieve the foregoing objective and in accordance with a first aspect of the present invention, a molten-salt battery including a positive electrode, a negative electrode, and a separator containing a molten salt and provided between the positive electrode and the negative electrode is provided. Each of the separator, the positive electrode, and the negative electrode is part of a plurality of separators, a plurality of positive electrodes, and a plurality of negative electrodes, respectively. The positive electrodes and the negative electrodes are stacked alternately. The positive electrodes are connected in parallel to each other and the negative electrodes are connected in parallel to each other.

In this case, the thinned positive and negative electrodes are stacked alternately to have a larger surface area per unit volume. As a result, the capacity density cannot be reduced even if the charging/discharging hour rate is high. In addition, the stacked positive electrodes are connected in parallel to each other and the negative electrodes are connected in parallel to each other, which achieves an increased battery capacity with no change in the battery voltage.

The positive electrodes of the molten-salt battery each have a thickness of preferably 0.1 mm to 5 mm. In this case, if the product of the thickness and the number of positive electrodes is constant, the ratio of the change in the capacity density to the change in the thickness of the positive electrodes can be kept substantially within the range of 1.5 to 2.5 when the charging/discharging hour rate is lower than about 0.1 C, as will be described hereinafter.

The positive electrodes of the molten-salt battery each have a thickness of preferably 0.5 mm to 2 mm. If the thickness of the positive electrodes is less than 0.5 mm, the increase in the capacity density hits a peak, while the increase in the number of electrodes brings another disadvantage. On the other hand, if the thickness of the positive electrodes is greater than 2 mm, it is necessary to reduce the charging/discharging hour rate to lower than 0.5 C.

The separators of the molten-salt battery are each preferably formed in a bag-like shape and preferably house one of the positive electrodes therein. In this case, since the positive electrodes are housed in the respective bag-like separators, the positive electrodes are insulated reliably from the negative electrodes even when the stacked positive and negative electrodes are misaligned in a direction intersecting the direction of stacking. In addition, when the positive and negative electrodes are housed together in a battery container and even when conduction may be provided between the battery container, composed of a conductor, and the negative electrodes, short circuit between the positive and negative electrodes through the battery container is prevented.

The molten-salt battery preferably further includes a battery container housing the separators, the positive electrodes, and the negative electrodes therein, and a pressing member provided in the battery container. The positive electrodes and the negative electrodes are preferably pressed between the pressing member and a wall surface of the battery container. In this case, the stacked positive and negative electrodes are prevented from being misaligned in a direction intersecting the direction of stacking. In addition, even when the thickness of the positive and negative electrodes change during charging and discharging, the change in the pressing force from the positive and negative electrodes to the separators are suppressed with an elastic deformation of the pressing member, whereby the positive- and negative-electrode reactions during charging and discharging and therefore the charging/ discharging itself are stabilized.

Effects of the Invention

In accordance with the present invention, the thinned positive and negative electrodes are stacked alternately.

Further, the positive electrodes are connected in parallel to each other and the negative electrodes are connected in parallel to each other, so that the positive and negative electrodes have a larger surface area per unit volume. As a result, the capacity density cannot be reduced even if the charging/ discharging hour rate is increased. Also, an increased battery capacity is achieved with no change in the battery voltage. It is therefore possible to provide a high-capacity and high-energy-density molten-salt battery.

BRIEF DESCRIPTION OF THE DRAWINGS

FIG. 6 is a table showing results of measuring the capacity density of the molten-salt battery of FIG. 1 at various thicknesses and numbers of positive electrodes;

MODES FOR CARRYING OUT THE INVENTION

First Embodiment

Figure 1:
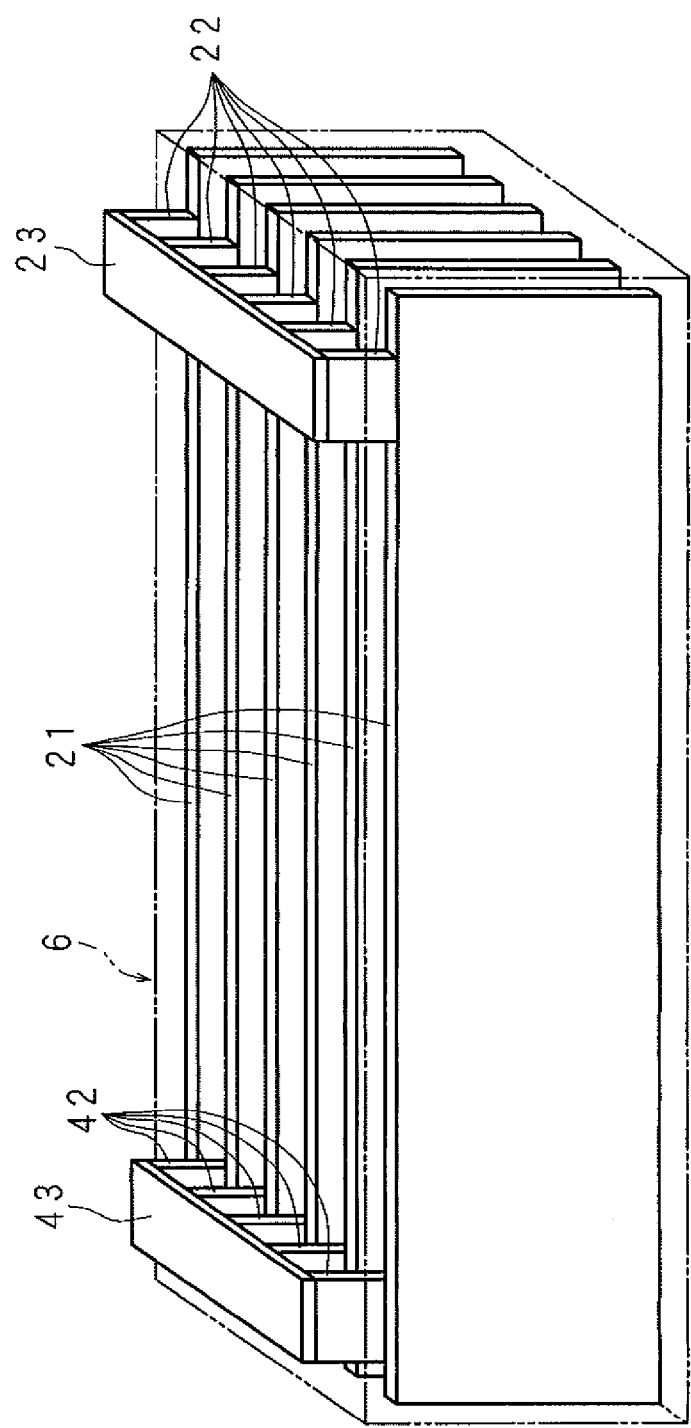
FIG. 1 is a perspective view schematically showing a substantial configuration of a molten-salt battery according to a first embodiment of the present invention.
Figure 2:
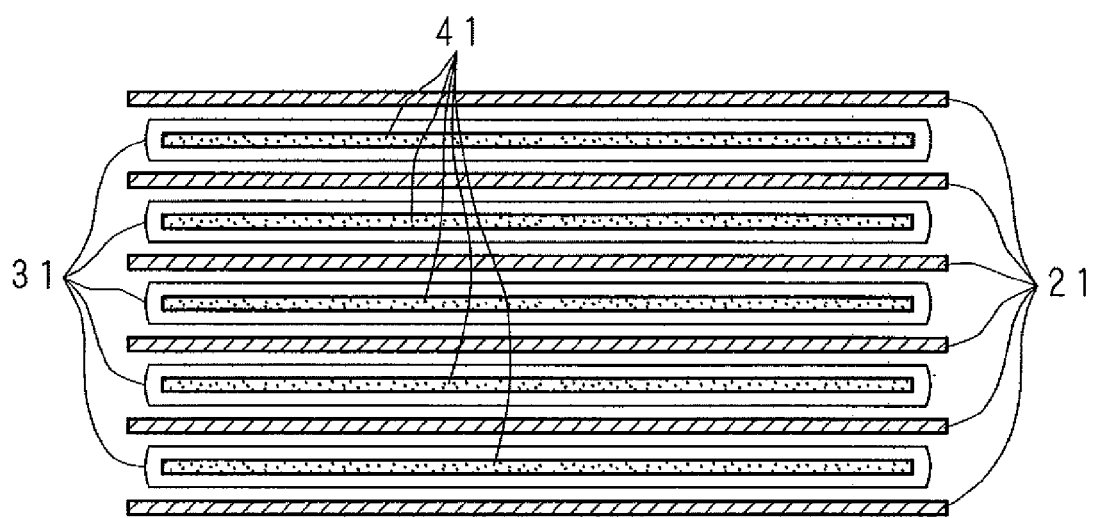
FIG. 2 is a horizontal cross-sectional view schematically showing the configuration of electric generation elements stacked in the molten-salt battery of FIG. 1.
Figure 3A:
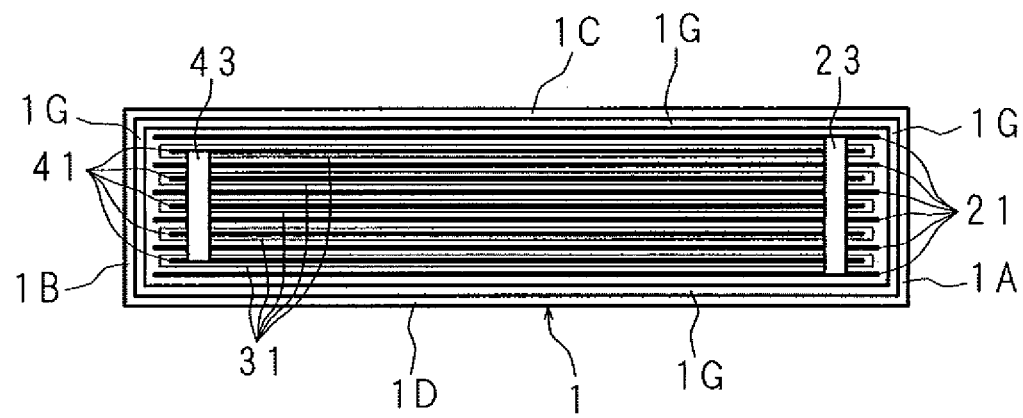
FIG. 3A is a top view schematically showing the configuration of the molten-salt battery of FIG. 1.
Figure 3B:
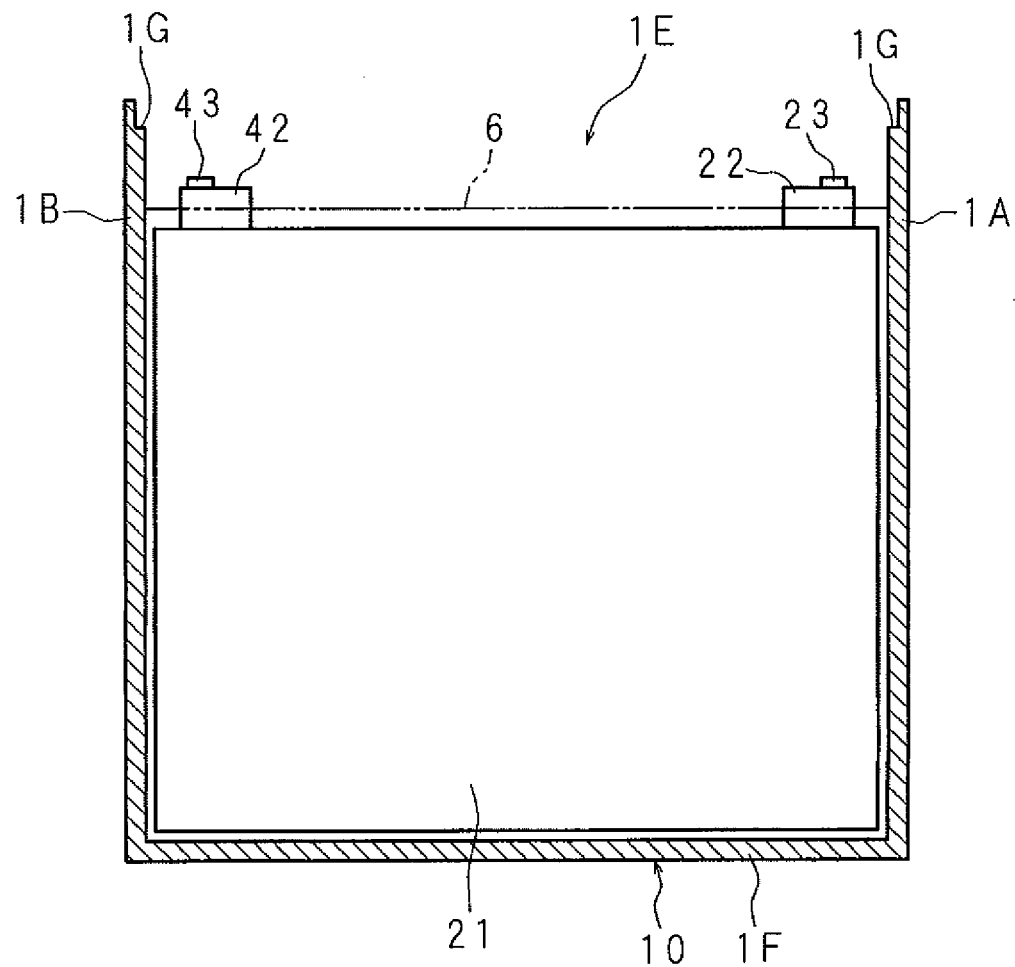
FIG. 3B is a vertical cross-sectional view schematically showing the configuration of the molten-salt battery of FIG. 1.

A first embodiment of the present invention will hereinafter be described in detail with reference to FIGS. 1 to 6.

As shown in FIGS. 1 to 3B, a molten-salt battery according to the first embodiment includes multiple (specifically six) rectangular plate-like negative electrodes 21 and multiple (specifically five) rectangular plate-like positive electrodes 41. Each positive electrode 41 is housed in a bag-shaped separator 31. The negative electrodes 21 and the positive electrodes 41 are arranged laterally and alternately in a standing manner. One negative electrode 21, one separator 31, and one positive electrode 41 constitute one electric generation element. That is, in this embodiment, five electric generation elements and one negative electrode 21 are stacked and housed in a rectangular parallelepiped battery container 10.

The battery container 10 includes a container body 1 having an opening 1E at the top thereof and a rectangular plate-like lid (not shown). The lid is fitted in a stepped portion 1G formed all around the opening 1E of the container body 1 to close the opening 1E. The container body 1 includes four side walls 1A, 1B, 1C, and 1D, and a bottom wall 1F. The container body 1 has a rectangular horizontal cross-section having short sides and long sides, where the side walls 1A and 1B correspond to the respective short sides, while the side walls 1C and 10 correspond to the respective long sides. The battery container 10 is made of aluminum alloy. The interior surface of the battery container 10 is insulated with fluorine resin coating.

A lower end portion of a rectangular tab (conductor) 22 for collecting current is joined to an upper end portion of each negative electrode 21 close to the side wall 1A of the container body 1. The upper end portion of the tabs 22 are joined to the lower surface of a rectangular plate-like tab lead 23. A lower end portion of a rectangular tab 42 for collecting current is joined to an upper end portion of each positive electrode 41 close to the side wall 1B of the container body 1. The upper end portions of the tab 42 are joined to the lower surface of a rectangular plate-like tab lead 43. The five electric generation elements and one negative electrode 21 are thus connected electrically in parallel to form a high-capacity molten-salt battery.

Each one of the negative electrodes 21 is composed of an aluminum foil plated with tin serving as a negative-electrode active material. Aluminum is suitably used for positive- and negative-electrode current collectors and has corrosion resistance to molten salts. The negative electrode 21 containing the active material has a thickness of about 0.14 mm. The negative electrode 21 also has a height of 100 mm and a width of 120 mm.

Each one of the positive electrodes 41 is formed to have a thickness of about 1 mm by infilling a current collector composed of an aluminum alloy porous solid with a mixture of binder, conductive additive, and $NaCrO_2$ serving as a positive-electrode active material. The positive electrode 41 has a thickness of about 1 mm. The height and width of the positive electrode 41 are less than those of the negative electrode 21 to prevent dendrite growth. The outer edge of the positive electrode 41 is therefore opposed to a portion inside the outer edge of the negative electrode 21 via a separator 31. The current collector of the positive electrode 41 may be composed of, for example, a non-woven fabric made of fibrous aluminum.

Each one of the separators 31 is composed of a fluorine resin film having resistance to a molten salt at the temperature at which the molten-salt battery operates, that is, composed of a porous material and formed in a bag shape. The separator 31 is immersed in the molten salt 6 put in the rectangular parallelepiped battery container 10 to a depth of about 10 mm from the liquid level, together with the negative electrode 21 and the positive electrode 41. This allows some lowering of the liquid level of the molten salt 6. The tab leads 23 and 43 serve as external electrodes providing connection between all of the stacked electric generation elements and an external electric circuit, and are located above the liquid level of the molten salt 6. The molten salt 6 is composed of an FSI (bis-fluorosulfonyl-imide) or TFSI (bis-trifluorosulfonyl-imide) anion and a sodium and/or potassium cation, but not limited thereto.

Heating the entire battery container 10 to 85° C. to 95° C. with external heating means (not shown) allows the molten salt 6 to be melted for charging and discharging.

Next will be described charging and discharging the molten-salt battery with reference to FIGS. 4 and 5.

Figure 4:
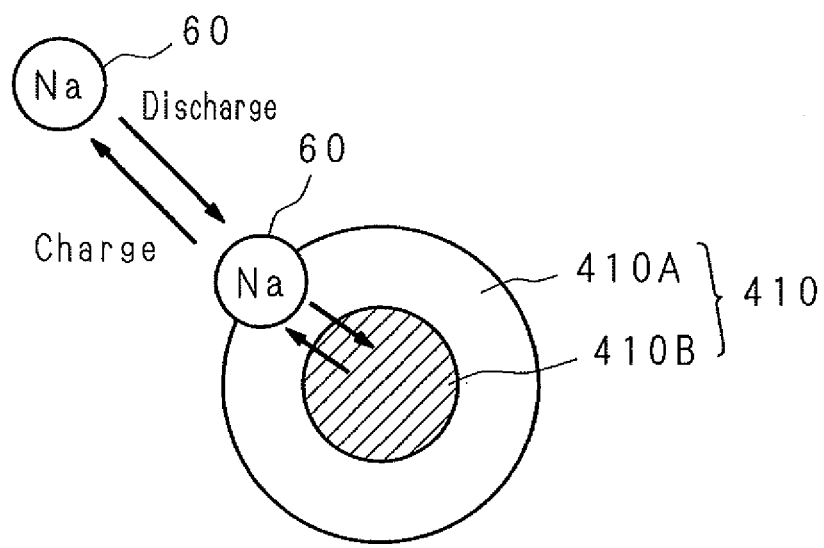
FIG. 4 is an explanatory diagram schematically showing sodium ion transfer to a positive-electrode active material in the molten-salt battery of FIG. 1.

Reference numeral 410 in FIG. 4 denotes a particulate positive-electrode active material. The positive-electrode active material 410 releases and receives a sodium ion 60 during charging and discharging of the molten-salt battery.

In more detail, during discharging of the molten-salt battery, sodium ions 60 travel from the negative electrode 21 through the molten salt 6 to enter a surface layer 410A of the positive-electrode active material 410. The sodium ions 60 then diffuse in an internal layer 410B of the positive-electrode active material 410. In this case, the sodium ions 60 to enter the surface layer 410A travel relatively fast through the liquid molten salt 6 to the surface layer 410A, while after insertion into the surface layer 410A, diffuse relatively slowly into the internal layer 410B, which is composed of the same solid as the surface layer 410A.

In contrast, during charging of the molten-salt battery, sodium ions 60 diffuse from the internal layer 410B into the surface layer 410A of the positive-electrode active material 410 as released from the surface layer 410A through the molten salt 6 to the negative electrode 21. In this case, the sodium ions 60 to be released from the surface layer 410A travel relatively fast from the surface layer 410A through the molten salt 6, while diffuse relatively slowly from the internal layer 410B into the surface layer 410A.

As mentioned above, during both charging and discharging, the mobility of sodium ions 60 between the positive electrode 41 and the negative electrode 21 varies substantially depending on the rate of diffusion of the sodium ions 60 between the surface layer 410A and the internal layer 410B of the positive-electrode active material 410. That is, it is necessary to increase the surface area of the positive-electrode active material 410 to achieve a higher charging/discharging hour rate.

Although the foregoing description is from a microscopic point of view in the positive-electrode active material 410, the same applies to a macroscopic point of view in the entire positive electrode 41.

Figure 5:
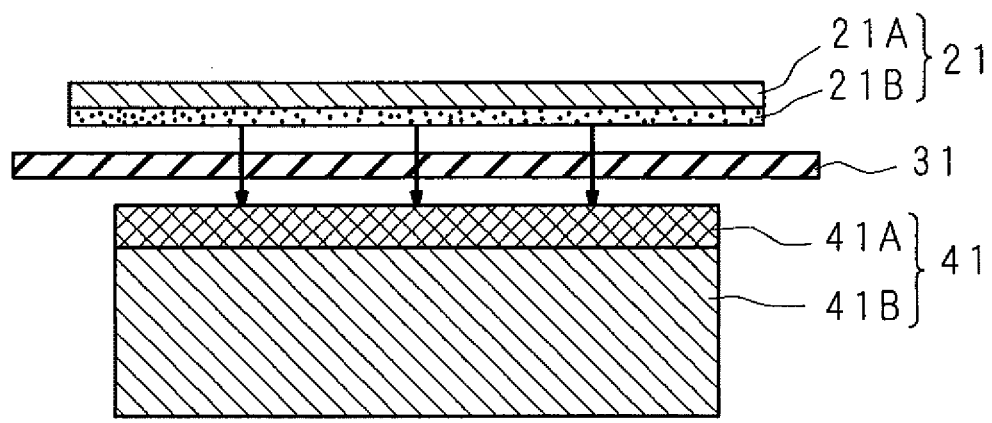
FIG. 5 is an explanatory diagram schematically showing sodium ion insertion into a positive electrode in the molten-salt battery of FIG. 1.

As shown in FIG. 5, the negative electrode 21 is formed by providing a tin plated layer 21B containing tin, which serves as a negative-electrode active material, on a negative-electrode current collector 21A composed of an aluminum foil. The positive electrode 41 is formed by infilling an aluminum alloy porous solid with a mixture of binder, conductive additive, and the positive-electrode active material 410, as mentioned above.

During charging of the molten-salt battery, sodium ions 60 released from the positive electrode 41 travel through the separator 31 to the negative electrode 21 and then become sodium on the negative electrode 21 to form an alloy with tin contained in the tin plated layer 21B. Next, during discharging of the molten-salt battery, sodium ions 60 released from the alloy in the tin plated layer 21B travel as indicated by the arrows in FIG. 5 to enter the positive electrode 41. In the case of a high discharging hour rate, the sodium ions 60 may not diffuse sufficiently from a surface portion 41A into a deep portion 41B of the positive electrode 41 according to the principle similar to the phenomenon described with reference to FIG. 4.

Specifically, if the discharging hour rate is higher than a certain value, the amount of sodium ions 60 entering the positive electrode 41 per unit time is greater than the amount of sodium ions 60 diffusing in the surface portion 41A, that is, insertion of sodium ions 60 into the surface portion 41A reaches a saturation point. This results in that the voltage of the positive electrode 41 with respect to the negative electrode 21 decreases to a discharge cutoff voltage, so that further discharging is stopped with the positive-electrode active material 410 in the deep portion 41B remaining unused for discharging.

In general, the battery capacity increases in proportion to the amount of active material in the positive electrode 41 and the negative electrode 21. However, for the foregoing reason, if the positive electrode 41 particularly has an increased thickness to contain an increased amount of positive-electrode active material 410, it is necessary to lower the charging/discharging hour rate, which is not suitable for applications that require rapid charging and discharging. Meanwhile, since the active material in the negative electrode 21 is tin, or a metal, which is to form an alloy with sodium, no problem similar to that on the positive electrode 41 due to that diffusion of sodium ions 60 can occur.

Hence, in the first embodiment, the thinned positive electrodes 41 and the negative electrodes 21 are stacked alternately to make it possible to rapidly charge and discharge the molten-salt battery.

The capacity density of the molten-salt battery was measured at various thicknesses and numbers of positive electrodes 41 (where the product of the thickness and the number of positive electrodes 41 was fixed to 20 mm·pieces). More specifically, molten-salt batteries having respective different thicknesses and numbers of positive electrodes 41 were heated to 90° C. and charged to 3.5 V at hour rates of 0.1 C, 0.5 C, and 1 C and then discharged to 2.5 V at the same hour rates, and the cycle was repeated to measure the capacity density (in mAh/g) during charging and discharging. The positive electrodes 41 used were rectangular, plate-like, about 100 mm square, and were formed by infilling a current collector composed of a fibrous aluminum non-woven fabric (with a weight per unit area of 550 g/m$^2$) having a fiber diameter of 100 μm with a mixture containing $NaCrO_2$ with an average particle size of about 10 μm. The electrolyte used was a molten salt composed of FSI, sodium, and potassium. The separators 31 used were glass papers having a thickness of about 200 μm. The negative electrodes 21 used were rectangular, plate-like, and were about 100 mm square with tin plated layers having a thickness of about 20 μm formed on both sides of a current collector composed of an aluminum foil having a thickness of about 100 μm. The hour rates 0.1 C, 0.5 C, and 1 C mean, respectively, current values (A) at which the quantity of electricity corresponding to the rated capacity (Ah) of each molten-salt battery can be supplied for every 0.1, 0.5, and 1 hour.

As shown in FIG. 6, the capacity density during charging at the hour rate of 0.1 C was 53 mAh/g in the case of the positive electrodes 41 having a thickness of 5 mm, while the same was 75 mAh/g in the case of the positive electrodes 41 having a thickness of 0.5 mm. The capacity density during discharging was slightly lower than the capacity density during charging at the same hour rate, as is the case with other types of batteries. The capacity density during charging and discharging in the case having the positive electrodes 41 having a thickness of 0.1 mm was substantially equal to that in the case of the positive electrodes 41 having a thickness of 0.5 mm. For this reason, results of measuring the capacity density of the molten-salt battery in the case of the positive electrodes 41 having a thickness of 0.1 mm are omitted in FIG. 6. Reducing the thickness of the positive electrodes 41 to less than 0.1 mm and accordingly increasing the number of stacked electrodes practically results not only in an increase in the number of the assembling processes, difficulty, costs, and rate of defectiveness, but also in an increase in the number of separators 31 and the number of positive- and negative-electrode current collectors. This leads to a reduction in the capacity density.

In the case of the positive electrodes 41 having a thickness of 0.5 mm, the capacity density during charging at the hour rate of 0.1 C was 75 mAh/g, while the capacity density during charging at the hour rate of 1 C was 68 mAh/g. That is, no significant reduction was observed. However, in the case of the positive electrodes 41 having a thickness of 1 mm, the capacity density during charging at the hour rate of 0.1 C was 75 mAh/g, while the capacity density during charging at the hour rate of 1 C was 23 mAh/g. That is, a significant reduction was observed. Also, in the case of the positive electrodes 41 having a thickness of 2 mm, the capacity density during charging and discharging at the hour rate of higher than 0.5 C was extremely lower than the capacity density during charging and discharging at the hour rate of 0.1 C. In the case of the positive electrodes 41 having a thickness of 5 mm, the capacity density during charging and discharging at the hour rate of higher than 0.1 C was extremely lower than the capacity density during charging and discharging at the hour rate of 0.1 C. For this reason, results of measuring the capacity density during charging and discharging at the hour rate of 1 C in the case of the positive electrodes 41 having a thickness of 2 mm and results of measuring the capacity density during charging and discharging at the hour rates of 0.5 C and 1 C in the case of the positive electrodes 41 having a thickness of 5 mm are omitted in FIG. 6, but denoted with "−".

The following are findings from the measurement results above.

(A) When the charging/discharging hour rate is lower than about 0.1 C, even if the thickness of the positive electrodes 41 changes within the range of 0.1 to 5 mm, the change in the capacity density is kept substantially within the range of 1.5 to 2.5 times.

(B) In the case of the positive electrodes 41 having a thickness of greater than 2 mm, the charging/discharging hour rate needs to be lower than 0.5 C to prevent the capacity density from decreasing significantly. In the case of the positive electrodes 41 having a thickness of greater than 5 mm, the charging/discharging hour rate needs to be lower than 0.1 C to prevent the capacity density from decreasing significantly.

As described heretofore, in the molten-salt battery according to the first embodiment, the positive electrodes are particularly thinned, and the thinned positive electrodes and the negative electrodes are stacked alternately to increase the surface area of the positive electrodes per unit volume and thereby to achieve an increased capacity density. In addition, the stacked positive electrodes are connected in parallel to each other and the negative electrodes are connected in parallel to each other, which achieves an increased battery capacity with no change in the battery voltage. It is therefore possible to achieve a high-capacity and high-energy-density molten-salt battery.

Further, if the product of the thickness and the number of positive electrodes is constant, the ratio of the change in the capacity density to the change in the thickness of the positive electrodes can be kept substantially within the range from 1.5 to 2.5 times in the case of the positive electrodes having a thickness of 0.1 mm to 5 mm when the charging/discharging hour rate is lower than about 0.1 C.

Furthermore, by setting the thickness of the positive electrodes in range from 0.5 mm to 2 mm by keeping the product of the thickness and the number of positive electrodes to be constant, the capacity density can be increased by reducing the thickness of the positive electrodes. Also the charging/discharging hour rate can be made higher than 0.5 C.

Moreover, since the positive electrodes are housed in the respective bag-like separators, the positive electrodes can be insulated reliably even when the stacked positive and negative electrodes are misaligned in a direction intersecting the direction of stacking. In addition, even when conduction is provided between the battery container and the negative electrodes, short circuit between the positive and negative electrodes through the battery container is prevented.

Second Embodiment

In the molten-salt battery according to the first embodiment, the positive electrodes 41 and the negative electrodes 21 stacked alternately with a separator 31 therebetween are housed directly in the battery container 10. On the other hand, in the molten-salt battery according to the second embodiment, the positive electrodes 41 and/or the negative electrodes 21 are pressed by a wall surface of the battery container 10. In the following description of the second embodiment, components identical to those in the first embodiment are designated by the same reference numerals to omit the detailed descriptions thereof.

Figure 7A:
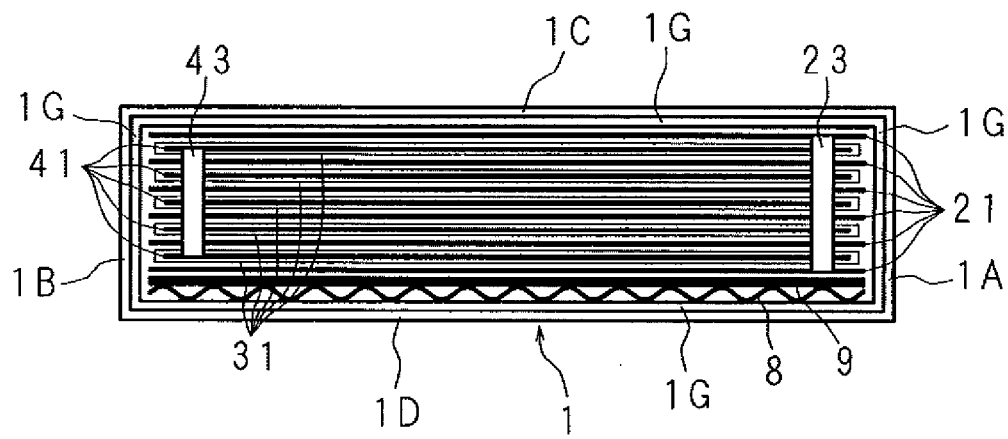
FIG. 7A is a top view schematically showing the configuration of a molten-salt battery according to a second embodiment of the present invention.
Figure 7B:
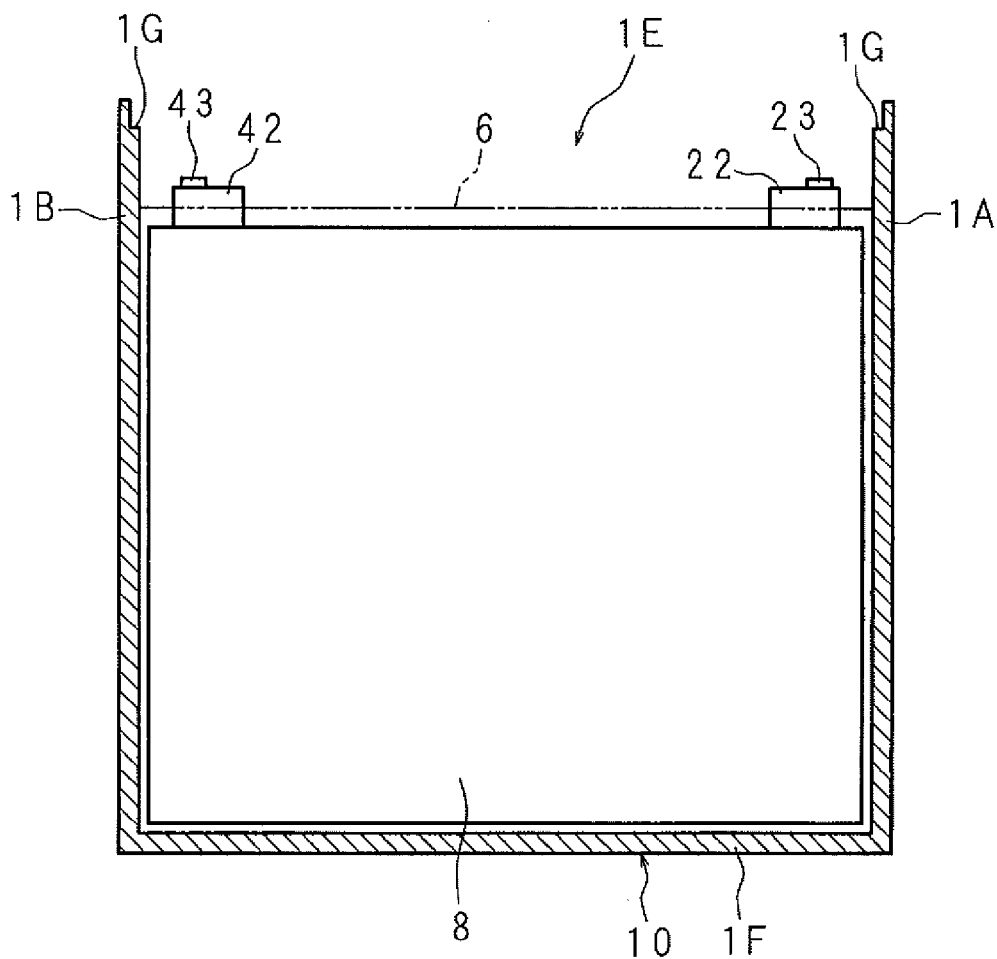
FIG. 7B is a vertical cross-sectional view schematically showing the configuration of the molten-salt battery of FIG. 7A.

As shown in FIGS. 7A and 7B, an aluminum alloy flat retainer plate 9 is arranged between the negative electrode 21 at the front (in the lowest position in FIG. 7A) and the side wall 1D, and an aluminum alloy corrugated plate spring 8 is arranged between the side wall 1D and the retainer plate 9. The plate spring 8 urges the retainer plate 9 rearward (upward in FIG. 7A). The negative electrode 21 at the front is pressed substantially uniformly rearward (upward in FIG. 7A) by the retainer plate 9 urged by the plate spring 8. As a reaction, the negative electrode 21 at the rear (in the highest position in FIG. 7A) is in turn pressed substantially uniformly forward (downward in FIG. 7A) by the inner surface of the side wall 1C, that is, the wall surface of the battery container 10.

When an external positive voltage is applied to the tab lead 43 with respect to the tab lead 23 for charging, sodium ions 60 travel from the positive electrodes 41 to the negative electrodes 21 to result in an increase in the thickness of the positive electrodes 41 and the negative electrodes 21. In contrast, when an external load is connected between the tab leads 23 and 43 for discharging, sodium ions 60 travel from the negative electrodes 21 to the positive electrodes 41 to result in a reduction in the thickness of the positive electrodes 41 and the negative electrodes 21. As the volume of the positive electrodes 41 and the negative electrodes 21 thus changes during charging and discharging, the thickness of the positive electrodes 41 and the negative electrodes 21 also changes. However, even when the thickness of the positive electrodes 41 and the negative electrodes 21 change, the positive electrodes 41 and the negative electrodes 21 are constantly pressed between the side wall 1C and the retainer plate 9.

As described heretofore, in the molten-salt battery according to the second embodiment, the positive electrodes and the negative electrodes are pressed between the side wall of the battery container and the retainer plate by the plate spring, which presses the negative electrode via the retainer plate.

This prevents the stacked positive and negative electrodes from being misaligned in a direction intersecting the direction of stacking of the positive electrodes and the negative electrodes. In addition, even when the thickness of the positive and negative electrodes change during charging and discharging, the change in the pressing force from the positive and negative electrodes to the separators is reduced by elastic deformation of the pressing member (plate spring), whereby the charging/discharging is stabilized.

Further, since the retainer plate transmits the pressing force by the plate spring to the negative electrode in a diffusing manner, the negative electrode is pressed substantially uniformly. This prevents the positive and negative electrodes from being deformed (wrinkled) and allows the positive- and negative-electrode reactions to proceed substantially uniformly during charging and discharging. Accordingly, further stabilized charging/discharging is achieved.

Although in the second embodiment, the plate spring is used as a pressing member and the retainer plate is used as a transmitting member for transmitting the pressing force by the pressing member, the present invention is not limited thereto. A plate-like silicon rubber, for example, may be used as the pressing member, so that the transmitting member can be omitted.

It is to be understood that the embodiments disclosed herein are illustrative only and not intended to be limiting in any respect. The scope of the present invention is defined by the terms of the claims, rather than the description above, and is intended to include any modifications within the scope and meaning equivalent to the terms of the claims.

DESCRIPTION OF THE REFERENCE NUMERALS

1 Container body
21 Negative electrode
31 Separator
41 Positive electrode
6 Molten salt
8 Plate spring (pressing member)
9 Retainer plate
10 Battery container

The invention claimed is:

1. A molten-salt battery comprising:
a positive electrode and a negative electrode; and
a separator containing a molten salt and provided between the positive electrode and the negative electrode, wherein
each of the separator, the positive electrode, and the negative electrode is part of a plurality of separators, a plurality of positive electrodes, and a plurality of negative electrodes, respectively,
the positive electrodes and the negative electrodes are stacked alternately,
the positive electrodes are connected in parallel to each other and the negative electrodes are connected in parallel to each other,
the positive electrodes each include $NaCrO_2$ as a positive electrode active material, and
the positive electrodes each have a thickness of 0.5 mm to 2 mm.

2. The molten-salt battery according to claim 1, wherein the separators are each formed in a bag-like shape and house one of the positive electrodes therein.

3. The molten-salt battery according to claim 1, further comprising:
a battery container housing the separators, the positive electrodes, and the negative electrodes therein; and
a pressing member provided in the battery container,
wherein the positive electrodes and the negative electrodes are pressed between the pressing member and a wall surface of the battery container.

* * * * *